(12) United States Patent
Mueller et al.

(10) Patent No.: US 10,096,896 B2
(45) Date of Patent: Oct. 9, 2018

(54) DIAPHRAGM AND METHOD FOR THE PRODUCTION THEREOF

(71) Applicant: GEMUE Gebr. Mueller Apparatebau GmbH & Co. Kommanditgesellschaft, Ingelfingen (DE)

(72) Inventors: Gert Mueller, Kuenzelsau (DE); Werner Floegel, Doerzbach (DE)

(73) Assignee: GEMUE Gebr. Mueller Apparatebau GmbH & Co. Kommanditgesellschaft, Ingelfingen (DE)

( * ) Notice: Subject to any disclaimer, the term of this patent is extended or adjusted under 35 U.S.C. 154(b) by 0 days.

(21) Appl. No.: 15/265,039

(22) Filed: Sep. 14, 2016

(65) Prior Publication Data

US 2017/0005406 A1 Jan. 5, 2017

Related U.S. Application Data

(63) Continuation of application No. PCT/EP2015/054528, filed on Mar. 4, 2015.

(30) Foreign Application Priority Data

Mar. 19, 2014 (DE) .......................... 10 2014 205 117

(51) Int. Cl.
*H01Q 1/24* (2006.01)
*H01Q 1/50* (2006.01)
*F16J 3/02* (2006.01)
*F16K 7/12* (2006.01)

(52) U.S. Cl.
CPC .................. *H01Q 1/50* (2013.01); *F16J 3/02* (2013.01); *F16K 7/12* (2013.01); *H01Q 1/24* (2013.01)

(58) Field of Classification Search
None
See application file for complete search history.

(56) References Cited

U.S. PATENT DOCUMENTS

| | | | | |
|---|---|---|---|---|
| 6,498,496 | B1 * | 12/2002 | Keller | F04B 43/009 324/557 |
| 7,929,726 | B1 * | 4/2011 | Jones | H04R 7/04 381/343 |
| 9,542,633 | B2 * | 1/2017 | Mueller | F16K 7/12 |
| 2003/0117044 | A1 * | 6/2003 | Urano | F04B 43/0054 310/367 |

(Continued)

FOREIGN PATENT DOCUMENTS

| | | |
|---|---|---|
| DE | 19925508 | 12/2000 |
| DE | 102005009443 | 9/2006 |

(Continued)

OTHER PUBLICATIONS

International Search Report for International Application PCT/EP2015/054528, dated May 18, 2015.

*Primary Examiner* — Trinh Dinh
(74) *Attorney, Agent, or Firm* — Burris Law, PLLC

(57) ABSTRACT

A diaphragm is described, wherein the diaphragm includes at least two layers, wherein at least one of the two layers is made of an elastomer, and wherein an electric circuit is provided between the two layers. In at least one of the two layers of the diaphragm, a conductive insert is provided, by means of which an electrical connection of the electric circuit to or from the outside of the diaphragm can be achieved.

8 Claims, 2 Drawing Sheets

(56) References Cited

U.S. PATENT DOCUMENTS

| | | | |
|---|---|---|---|
| 2004/0124748 A1* | 7/2004 | Takeshima | H04R 17/00 310/331 |
| 2005/0115402 A1 | 6/2005 | Hembree | |
| 2007/0190881 A1* | 8/2007 | Shibaoka | D03D 1/0088 442/228 |
| 2008/0137884 A1* | 6/2008 | Kim | H04R 19/005 381/174 |
| 2010/0020991 A1* | 1/2010 | Chen | B81B 3/0078 381/162 |
| 2010/0059595 A1 | 3/2010 | Longfu | |
| 2010/0303687 A1* | 12/2010 | Blaga | B01L 3/50273 422/504 |
| 2013/0139895 A1* | 6/2013 | Vangbo | B01L 3/502738 137/2 |
| 2014/0011390 A1 | 1/2014 | Koichi | |
| 2014/0036005 A1* | 2/2014 | Nystrom | B41J 2/14314 347/71 |
| 2015/0016657 A1* | 1/2015 | Song | H04R 7/10 381/398 |
| 2016/0315247 A1* | 10/2016 | Boser | B06B 1/0666 |

FOREIGN PATENT DOCUMENTS

| | | |
|---|---|---|
| DE | 102011086896 | 5/2013 |
| GB | 2433298 | 6/2007 |
| WO | 2006001971 | 1/2006 |

* cited by examiner

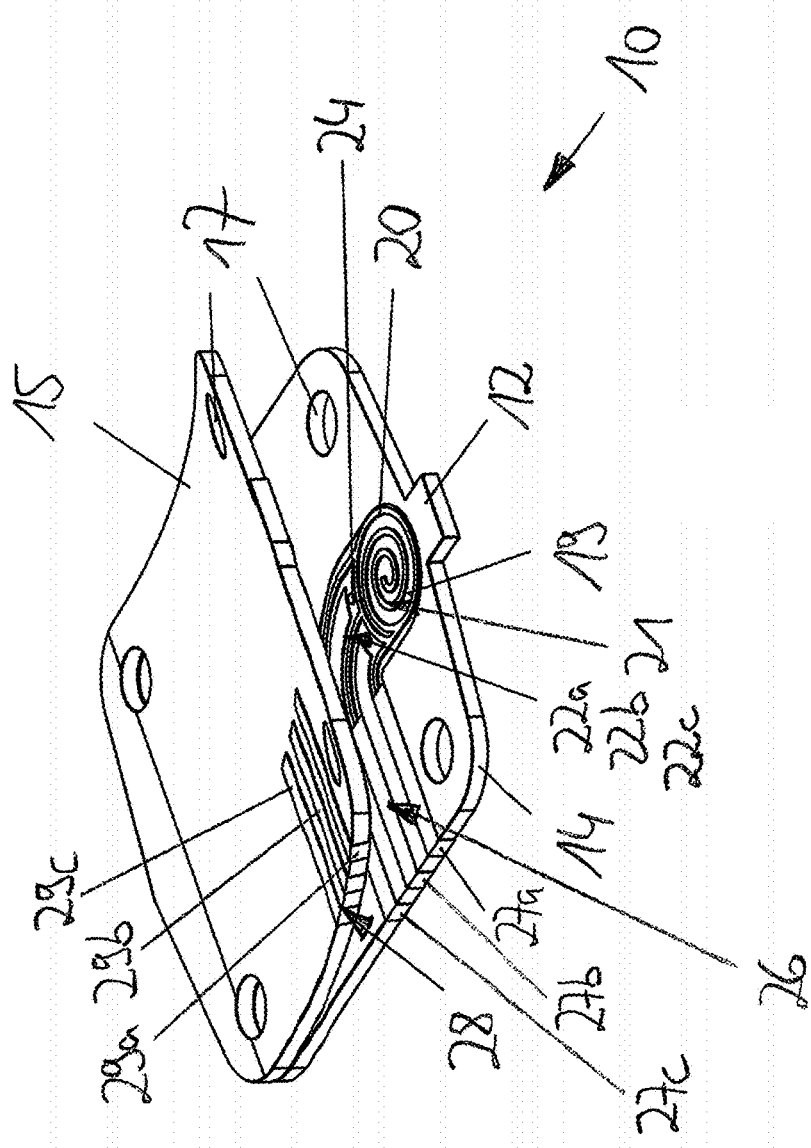

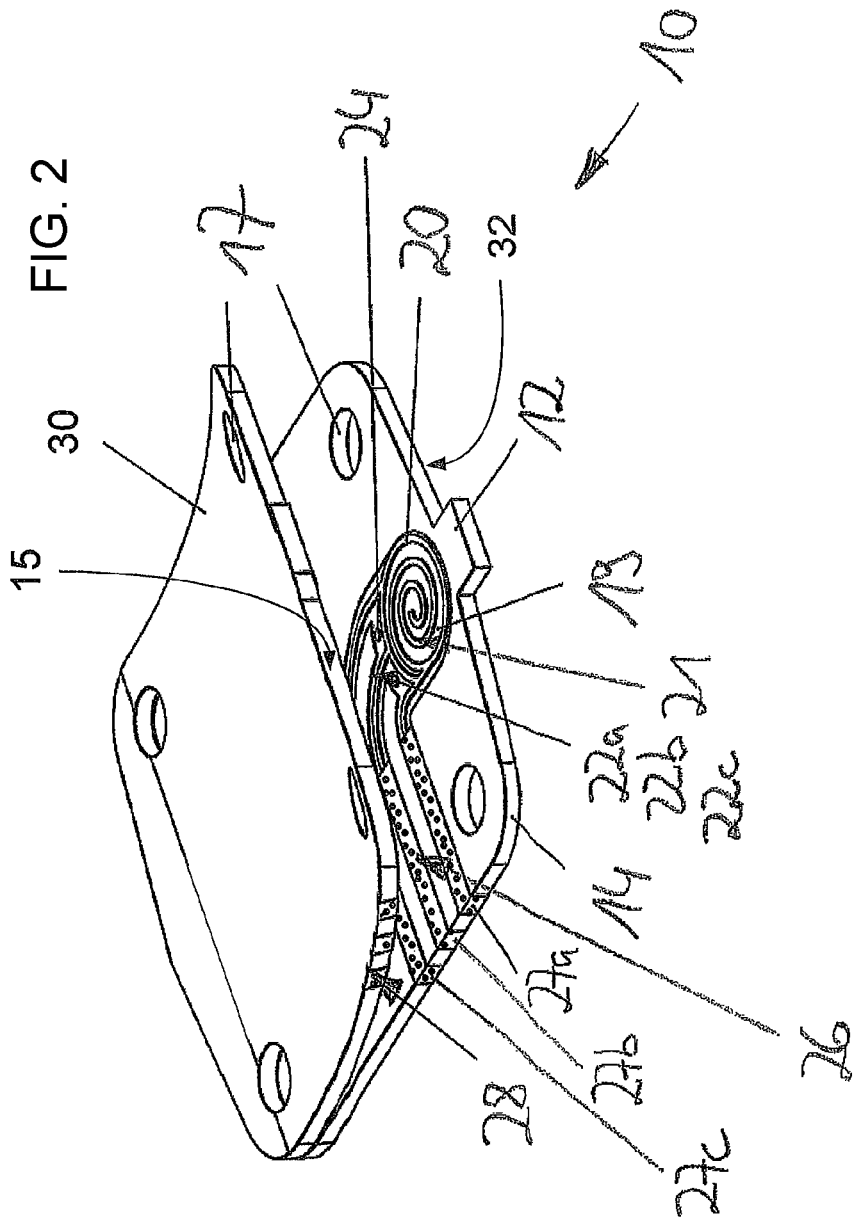

DIAPHRAGM AND METHOD FOR THE PRODUCTION THEREOF

CROSS-REFERENCE TO RELATED APPLICATIONS

This application is a continuation of International Application No. PCT/EP2015/054528 filed on Mar. 4, 2015 which claims the benefit of DE 10 2014 205 117.7 filed on Mar. 19, 2014. The disclosures of the above applications are incorporated herein by reference in their entirety.

FIELD

The present disclosure relates to a diaphragm and a method for producing the diaphragm.

BACKGROUND

The statements in this section merely provide background information related to the present disclosure and may not constitute prior art.

From WO 2006/001971 A2, an approach is known for electrically connecting an antenna, which is arranged between the layers of a multilayer laminate structure, on the outside. The contact to the antenna is achieved by means of openings in the laminate structure.

SUMMARY

The present disclosure provides an improved diaphragm of the type set forth above with respect to the electrical contact, by means of a diaphragm according to claim 1, as well as a method according to claim 10.

In at least one of the two layers of the inventive diaphragm, a conductive insert, with which an electrical connection of the electric circuit to or from the outside of the diaphragm can be achieved, is provided according to the teachings of the present disclosure.

By means of the present disclosure, openings in the layers of the diaphragm are avoided. Instead, the contact to the electric circuit is integrated into the diaphragm—namely, in at least one of the two layers of the diaphragm. In this way, it is possible to leave the properties of the diaphragm unchanged or to not change the diaphragm properties by means of openings or the like. Furthermore, the production of the diaphragm is also simplified.

In one form, the conductive insert contains conductive particles, which are introduced into the material of the relevant layer. For example, the relevant layer is enriched with carbonaceous material at the location or in the vicinity of the conductive insert. In this way, the production of the diaphragm is further simplified.

It is furthermore possible that the conductive insert comprises at least one lead. With this lead, the electrical connection of the electric circuit to or from the outside of the diaphragm can then be realized.

In another form of the present disclosure, the electric circuit is provided on a support, wherein the support is arranged on or between the layers. In one form, the electric circuit comprises conductor paths and/or other electrical structures made of an electrically conductive material, which are arranged on the support.

Additional features, possible applications, and advantages of the present disclosure can be taken from the description below of exemplary forms of the present disclosure, which are illustrated in the respective figure. Here, all described or illustrated features themselves or in any combination are to be considered as being within the scope of the present disclosure, irrespective of their summarization in the claims or their reference, and irrespective of their wording or illustration in the description or in the figure respectively.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawing, in which:

FIG. 1 is a perspective view of an exemplary form of a diaphragm constructed according to the teachings of the present disclosure; and FIG. 2 is a perspective view of another exemplary form of a diaphragm constructed according to the teachings of the present disclosure.

The drawing described herein is for illustration purposes only and is not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a diaphragm 10, which can, in particular, be used in a valve—for example, in a pneumatic or hydraulic or electrically operated diaphragm valve. In the top view, the diaphragm 10 in one form has an approximately rectangular diaphragm surface and an essentially constant diaphragm thickness transverse to the diaphragm surface.

Of course, the diaphragm 10 may also have a differently designed geometric shape. For example, the diaphragm 10 may also have a round shape.

It is noted that the diaphragm 10 in FIG. 1 is illustrated only for purposes of explanation in such a way that a yet to be explained top layer is partially opened upward; this is, however, not the case in the completed diaphragm 10.

The approximately rectangular diaphragm surface constitutes the functional area of the diaphragm 10. In this functional area, approximately, the diaphragm 10 is installed in the associated valve. For example, the diaphragm 10 may be arranged in the functional area between two housing parts (not shown) of the associated valve.

On one of the longitudinal sides, the diaphragm 10 has a tab 12. In the illustrated form, the tab 12 is designed as an approximately rectangular projection, which protrudes beyond the approximately rectangular diaphragm surface. The dimensions of the tab 12—in particular, the extension of the tab 12 approximately transverse to the respective longitudinal side of the diaphragm 10—are selected such that the tab 12 also protrudes beyond any housing parts of the associated valve.

Of course, the tab 12 may also have a differently designed geometric shape. Where appropriate, the tab 12 may also be completely omitted.

The diaphragm 10 with the tab 12 is constructed of a plurality of layers, wherein each of the individual layers may comprise an elastomer, a woven fabric, a stabilizing layer, or the like, and wherein the elastomers and the woven fabrics of the different layers may respectively comprise different materials, such as rubber, silicone, or the like.

As can be seen in FIG. 1, the diaphragm 10 comprises at least two layers—namely, a base layer 14 and a top layer 15. The two layers 14, 15 are congruent, and both have the approximately rectangular surface of the diaphragm 10. Alternatively, it is also possible for the surfaces of the base layer 14 and the top layer 15 to deviate from one another and thus overlap only partially.

In order to position the base layer 14 and the top layer 15 with respect to one another, both layers 14, 15 are respectively provided with at least one opening 17. In the illustrated form, four openings 17, respectively, are provided, which are arranged in the region of the corners of the diaphragm 10.

Between the base layer 14 and the top layer 15, a support 19 is provided, which is equipped with an electric circuit 20. The support 19 can also be arranged on one of the layers.

The support 19 is designed to be planar and has merely a slight thickness. The support 19 may, for example, be a film—in particular, a flexible film. The support 19 comprises an electrically non-conductive material. The support 19 may have the shape of the diaphragm 10. It is, however, also possible for the surface of the support 19 to be smaller than the surface of the diaphragm 10. It is, in particular, possible for the support 19 to have only the surface area that is required to accommodate the electric circuit 20 on the support 19.

The electric circuit 20 may, for example, comprise conductor paths and/or other electrical structures made of an electrically conductive material, which are arranged on the support 19. The electric circuit 20 may also include resistances and/or capacitances and/or inductances. This may be achieved by an appropriate design of the structure and/or an appropriate selection of the material for the conductor paths. The electric circuit 20 may thus, for example, constitute a part of an antenna and/or a part of a measuring circuit and/or the like.

The electric circuit 20 is arranged on the support 19 and firmly connected to it. For example, the electric circuit 20 may be vapor-deposited onto the support 19 or firmly mounted onto the support 19 in another manner.

Additionally, with respect to the support 19 and the electric circuit 20, reference is made to so-called flexible printed circuit boards, which are thin, flexible electric circuits that are constructed on, for example, polyimide films.

In the present illustrated form, the electric circuit 20 has a spiral structure 21 of an antenna, which is provided with three exemplary connecting lines 22a, 22b, 22c. In the present case, the support 19 furthermore has a surface that is only slightly larger than the surface constituted by the spiral structure 21 and the connecting lines 22a, 22b, 22c.

Of course, other numbers of connecting lines, as well as other laminar shapes of the structure 21, are also conceivable.

In the illustrated form, it is assumed that at least the region facing the electric circuit 20 of the base layer 14 and/or top layer 15 of the diaphragm 10 is electrically non-conductive. Where applicable, this can be achieved by means of an additional non-conductive layer or the like, which is arranged in the region of the electric circuit.

In order to position the support 19 on the base layer 14, the support 19 and the base layer 14 are respectively provided with at least one opening 24. In the illustrated form, two openings 24 are respectively provided, which are arranged in the region between the three connecting lines 22a, 22b, 22c. Of course, the support 19—instead of the base layer 14—may also be positioned with respect to the top layer 15.

The support 19 together with the electric circuit 20 may be firmly connected to the base layer 14 and/or the top layer 15. This may, for example, be achieved by means of an adhesive or another material, which is inserted between the support 19 and the base and/or top layer 14, 15. The fixing of the support 19 within the diaphragm 10 may alternatively, however, also be carried out by connecting the base layer 14 and the top layer 15 firmly to each other, and in this way also connecting the support 19 firmly with the base and/or top layer 14, 15.

In the base layer 14, a conductive insert 26 is provided, which consists of three linear leads 27a, 27b, 27c in the illustrated form.

The conductive insert 26 or each linear lead 27a, 27b, 27c may be obtained in that, at the desired locations or in the desired regions of the base layer 14, additional conductive particles are introduced into the material of the base layer 14. A doping of the material of the base layer 14 with conductive particles thus occurs precisely where the conductive insert 26 or the linear leads 27a, 27b, 27c are to be arranged. It is, for example, possible to enrich the material of the base layer 14 at the desired locations or in the desired regions with a carbonaceous material.

Analogously, a conductive insert 28, which, for example, consists of three linear leads 29a, 29b, 29c, is also provided in the top layer 15 in the illustrated form.

Of course, alternatively, only one of the two inserts 26, 28 may be present, and/or, alternatively, only one or two linear leads may be present in the inserts 26, 28, or appropriate mixed forms may be provided.

By means of the conductive inserts 26, 28 or the linear leads 27a, 27b, 27c, 29a, 29b, 29c, an electrical connection of the electric circuit 20 to or from the outside of the diaphragm 10 is achieved.

The leads 27a, 27b, 27c, 29a, 29b, 29c of the two conductive inserts 26, 28, which may be linear in one form as shown, are arranged within the base layer 14 and the top layer 15 such that a contact of the previously mentioned leads with the connecting leads 22a, 22b, 22c is possible from a spatial perspective. This can, in particular, be achieved by the linear leads 27a, 27b, 27c, 29a, 29b, 29c at least partially forming an overlap region with the associated connecting leads 22a, 22b, 22c.

The contact between the linear leads 27a, 27b, 27c, 29a, 29b, 29c and the connecting leads 22a, 22b, 22c may be carried out by pressing the layers 14, 15 onto or together with the support 19 arranged between them. Alternatively or in addition, it may be provided that a firm connection is established in the mentioned overlap regions by means of a conductive adhesive and therewith a contact achieved.

Furthermore, the leads 27a, 27b, 27c, 29a, 29b, 29c of the two conductive inserts 26, 28 are arranged within the base layer 14 and the top layer 15 such that an electrical contact of the same to or from the outside of the diaphragm 10 is possible. In the illustrated form, this is achieved in that contact with the leads 27a, 27b, 27c, 29a, 29b, 29c may be made on the top side of the diaphragm 10, on the face side of the diaphragm 10, as well as on the bottom side of the diaphragm 10. Of course, in doing so, only a single possible contact may also be sufficient.

Additionally, the diaphragm 10 may be provided with upper and/or protective layers 30, 32 (FIG. 2). These protective layers 30, 32 (FIG. 2) may then have appropriate openings at those locations where an electrical contact of the leads 27*a*, 27*b*, 27*c*, 29*a*, 29*b*, 29*c* is to take place.

In the following, a possible method for producing the diaphragm 10 is explained.

As has been explained, the diaphragm 10 is constructed of several layers—out of at least the base layer 14 and the top layer 15. The desired shape or outer contour of the diaphragm 10 is initially cut out of the respective materials of the individual layers. This outer contour is, for example, punched out of the provided elastomer(s), as well as out of the woven fabric material(s) provided.

Subsequently, the individual cut-out layers of the diaphragm 10 are arranged in the desired sequence on top of one another and inserted into a tool—in particular, into a mold cavity. Within the scope of these measures—namely, prior to mounting the top layer 15 onto the base layer 14 of the diaphragm 10—the support 19 is inserted together with the electric circuit 20.

In doing so, the support 19 with the electric circuit 20 is produced in advance independently of the diaphragm 10.

For positioning the layers 14, 15 and the support 19, the openings 17, 24 are used.

Subsequently, the arrangement of the layers of the diaphragm 10 present in the tool, together with the support 19 contained therein, is vulcanized.

Of course, other methods for production of the diaphragm 10 are also conceivable.

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A diaphragm, wherein the diaphragm comprises at least two layers, wherein at least one of the at least two layers comprises an elastomer, and wherein, between the at least two layers, an electric circuit is provided, wherein a conductive insert is disposed within one of the at least two layers, the conductive insert providing an electrical connection of the electric circuit to or from an outside of the diaphragm, wherein the conductive insert comprises at least one lead, and wherein the conductive insert contains conductive particles, the conductive particles being introduced into a material of the one layer within which the conductive insert is disposed.

2. The diaphragm according to claim 1, wherein the one layer within which the conductive insert is disposed is enriched with carbonaceous material at a location or in a vicinity of the conductive insert.

3. The diaphragm according to claim 1, wherein the lead is linear.

4. The diaphragm according to claim 1, wherein contact with the conductive insert is made from the outside of the diaphragm.

5. The diaphragm according to claim 1, wherein the electric circuit is provided on a support, and wherein the support is arranged on or between the at least two layers.

6. The diaphragm according to claim 5, wherein the electric circuit comprises at least one of conductor paths and electrical structures made of an electrically conductive material arranged on the support.

7. The diaphragm according to claim 1, wherein the electric circuit comprises a structure as a spiral structure of an antenna.

8. The diaphragm according to claim 1, wherein the diaphragm is provided with at least one of an upper protective layer and a lower protective layer disposed over the at least two layers.

* * * * *